Dec. 17, 1940.   F. O. CONILL   2,225,257
RAZOR
Filed July 21, 1936   4 Sheets—Sheet 1
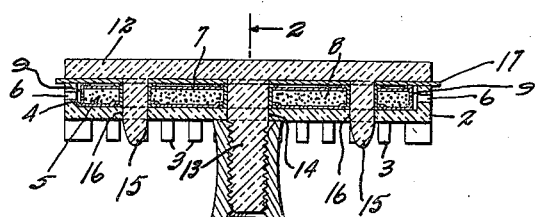
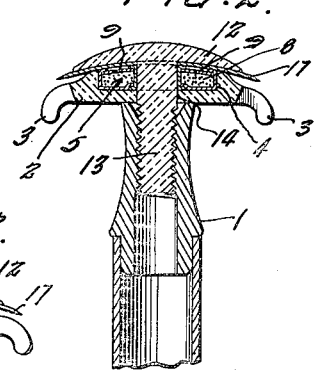
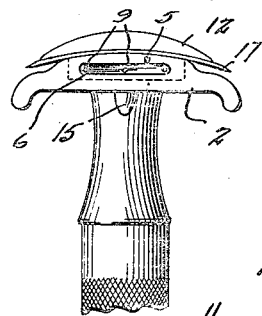
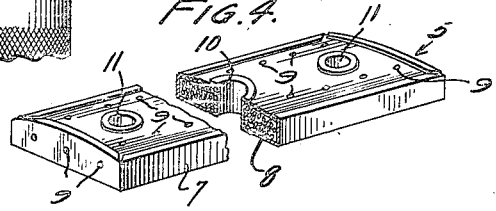
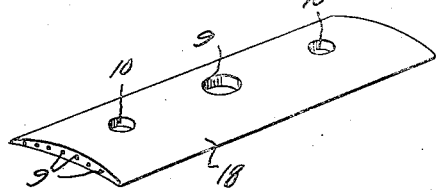
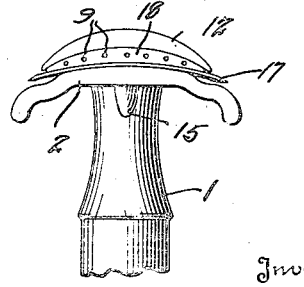
Inventor
FERNAN O. CONILL
By Semmes & Semmes
Attorneys

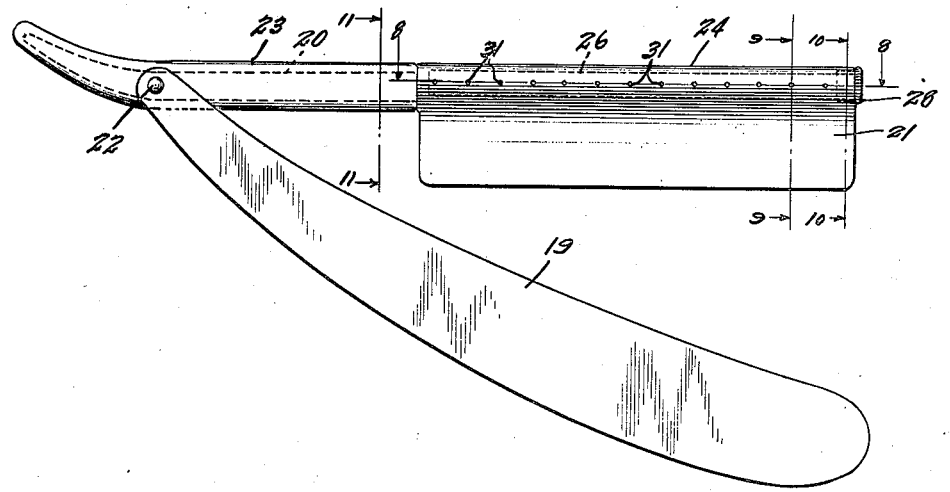
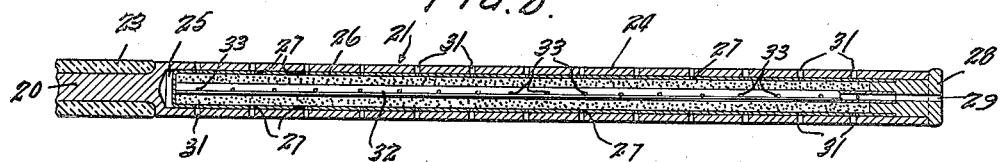
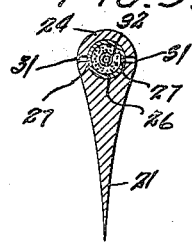 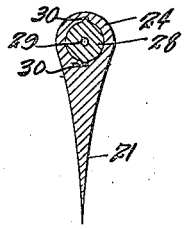 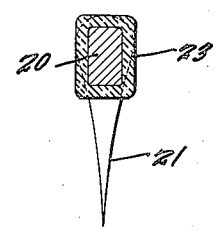

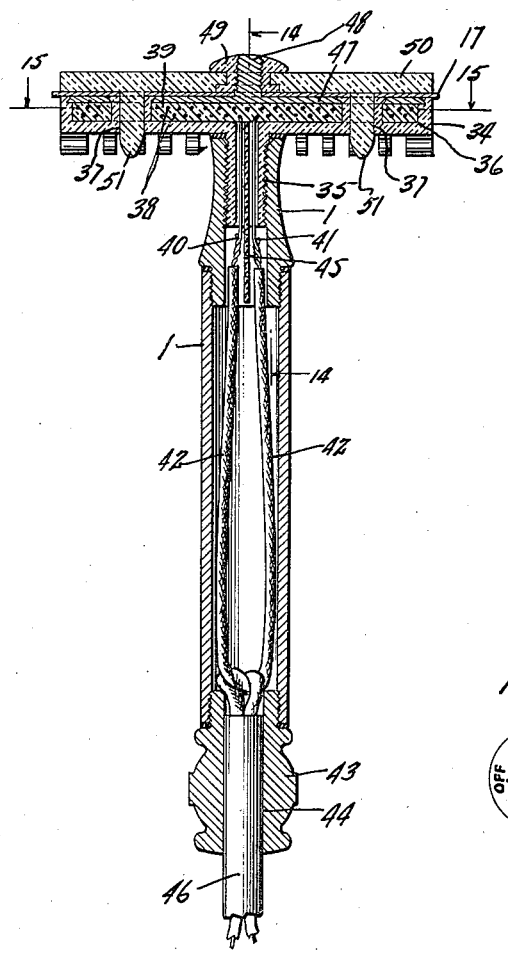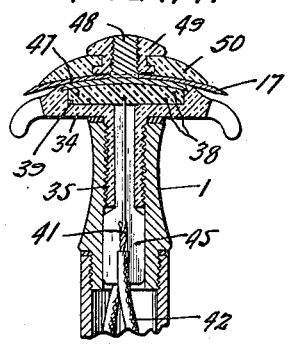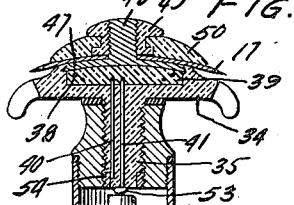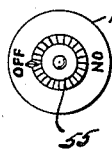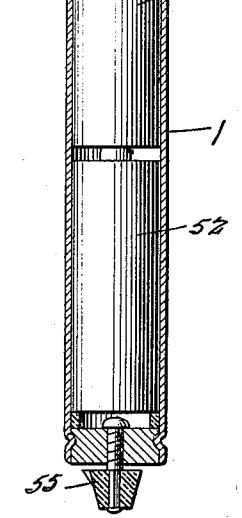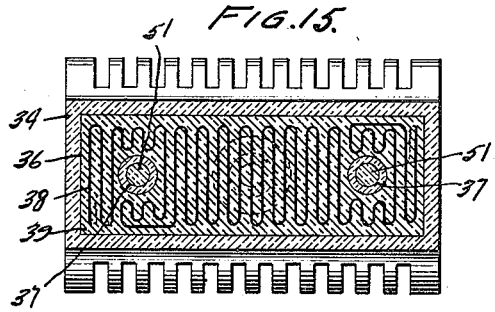

Dec. 17, 1940.   F. O. CONILL   2,225,257
RAZOR
Filed July 21, 1936    4 Sheets-Sheet 4
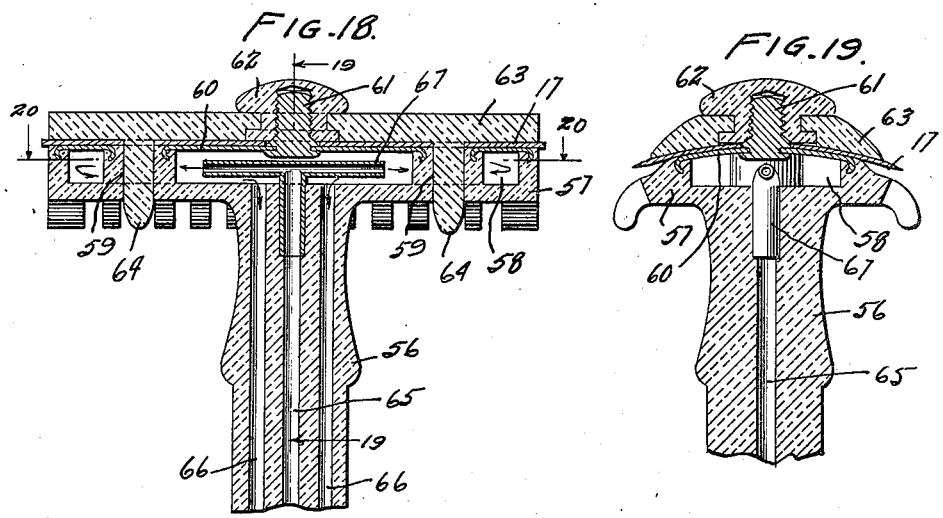
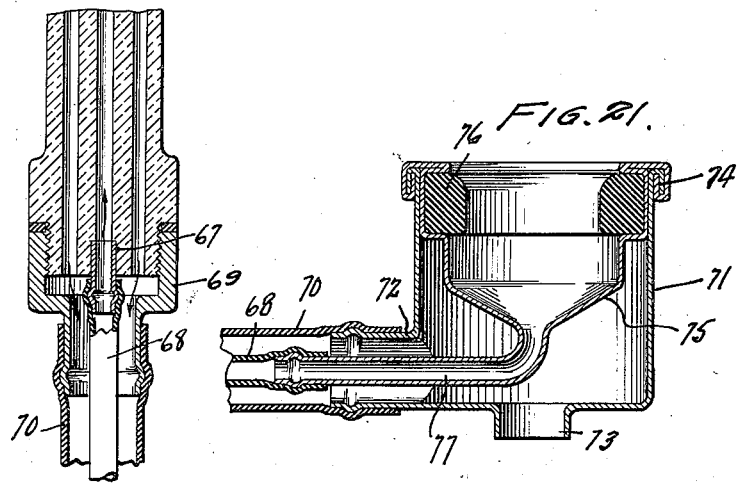
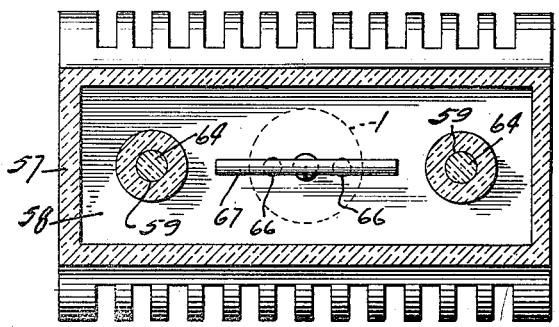
Inventor
FERNAN O. CONILL
By Semmes & Semmes
Attorneys Patented Dec. 17, 1940

2,225,257

UNITED STATES PATENT OFFICE 2,225,257

RAZOR

Fernan O. Conill, New York, N. Y.

Application July 21, 1936, Serial No. 91,786

2 Claims. (Cl. 30—34)

This invention relates to razors, and more particularly has reference to means for heating the blade. While I have shown my invention as applied to razors, it will of course be readily appreciated that it is of much broader application, and can be used equally as well in other forms of cutting tools, such as surgical instruments or the like.

As is well known, heat improves the cutting efficiency of a cutting edge. It has been customary in shaving to immerse the razor in hot water in order to obtain a good shave. However, such a procedure is not particularly efficacious, in that the heat is usually dissipated very quickly and necessitates the immersion of the razor in the hot water a number of times during the shaving operation.

An important object of my invention is to provide a cutting instrument having cutting edges with means for heating the edges.

Another object of my invention is to provide a razor with means for generating heat within the razor for heating the blade.

Still another object of my invention is to provide a razor with a heat generating unit positioned in the blade supporting member.

Yet another object of my invention is to provide a razor having means for heating the blade and maintaining the blade at the desired temperature throughout the shaving process.

A further object of my invention is to devise a razor all portions of which contacting the skin, with the exception of the blade, being of materials which are non-conductive of heat.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a longitudinal section of one of the forms of my invention.

Figure 2 is a view taken along the line 2—2 of Figure 1.

Figure 3 is an end view of the device shown in Figure 1.

Figure 4 is a perspective view of a cartridge containing heat liberating substances.

Figure 5 is a perspective view of another form of chemical cartridge.

Figure 6 is an end view of a modified form of my invention.

Figure 7 is a side elevation showing my invention applied to a straight razor.

Figure 8 is a view taken along the line 8—8 of Figure 7.

Figure 9 is a view taken along the line 9—9 of Figure 7.

Figure 10 is a view taken along the line 10—10 of Figure 7.

Figure 11 is a view taken along the line 11—11 of Figure 7.

Figure 12 is a perspective view of the chemical cartridge shown in Figure 7.

Figure 13 is a longitudinal section of yet another form of my invention.

Figure 14 is a view taken along the line 14—14 of Figure 13.

Figure 15 is a view taken along the line 15—15 of Figure 13.

Figure 16 is a longitudinal section of the form of my device shown in Figure 13, in which dry cells are employed.

Figure 17 is a bottom view of Figure 16.

Figure 18 is a longitudinal section of another form of my invention.

Figure 19 is a view taken along the line 19—19 of Figure 18.

Figure 20 is a view taken along the line 20—20 of Figure 19.

Figure 21 is a longitudinal section of the device for attaching the razor shown in Figure 18 to a source of heated fluid.

My invention comprehends the employment of suitable heat producing means within the razor for heating the edge of the blade. The advantages attained by such a construction are believed to be readily apparent. Not only will the heated blade afford a much superior shave, but it will also prevent any infection which may occur by cutting the skin, pimples, etc.

In order to prevent any danger of injury to the skin, I form all portions of the razor which come into contact with the skin, with the exception of the blade, of suitable heat insulating material such as hard rubber, Bakelite, or the like.

Referring to the drawings, and more particularly to Figure 1, in which like numerals designate similar parts, there is shown a razor having a handle portion 1 and a blade supporting member 2 having the usual teeth 3. The blade supporting member is formed of any material which is non-conductive of heat, such as hard rubber.

As clearly shown in Figures 1 and 2, the supporting member 2 is provided with a recessed portion 4. The recessed portion 4 is of sufficient size to accommodate a chemical cartridge designated generally 5. A pair of elongated slots or apertures 6 are provided in each of the side walls of the supporting member 2.

As shown in Figure 4, the cartridge is composed of an outer shell or the like 7 of substantially rectangular shape and a heat generating chemical compound 8. The outer shell 7 can be made of paper or light metal.

The chemical compound 8 may be of any composition which will generate or produce heat when combined with water. For example, I have found that calcium oxide is well adapted for this purpose.

A plurality of orifices 9 are provided in the outer shell 7 for permitting water to penetrate into the chemical, as will hereinafter be more fully described.

The cartridge is also provided with a central opening 10 and a pair of smaller openings 11 disposed on each side of the opening 10.

I have found that the temperature can be controlled both by the chemical which is used and by the number of orifices which are provided in the outer shell of the cartridge.

A guard or keeper 12 of material which is non-conductive of heat is provided with a centrally positioned stud 13 which passes through the opening 10 in the cartridge and the opening 14 in the supporting member 2 and is screw threaded into the handle for maintaining the razor in assembled position. The keeper is also formed with a pair of shorter studs 15 which pass through the openings 11 in the cartridge and the openings 16 in the portion 2. It will be readily appreciated that when the keeper is screwed into the handle, it will keep the blade 17 in the proper position for shaving.

It should be further noted that the keeper 12 and the supporting member 2 which contact the face during the shaving process are composed of material which is non-conductive of heat. This construction is particularly advantageous as it will overcome any danger of injuring or burning the skin while shaving.

In operation, the cartridge 5 is placed within the recess 4 and the blade 17 is then placed upon the supporting member 2 and the keeper is fitted into the handle 1. It will be appreciated that the razor is now ready for use. When it is desired to generate or produce heat for heating the blade 17, the razor is immersed in water. The water enters through the apertures 6 in the blade supporting member 2 and penetrates into the chemical compound within the cartridge through the orifices 9. As soon as the water contacts the chemical, heat will be generated and heat the blade. The blade will thereby be kept in a heated condition through the process of shaving without having to continually be dipping the razor into the water. Moreover, the blade will be maintained at the desired temperature as long as it is necessary.

When the user has finished shaving, he merely unscrews the keeper from the handle and removes the cartridge from the recess in the supporting member.

It will be appreciated that, even though the blade supporting member must be of a special form, it is of relatively simple construction and does not detract from the appearance of the razor.

In Figure 6 I have shown the cartridge used with a conventional safety razor. As can be seen in Figure 5, the chemical cartridge 18 is of arcuate shape and conforms substantially to the configuration of the keeper or guard 12. When it is desired to use the razor, the cartridge is placed between the keeper 12 and the blade 17 and the razor is then immersed in water for producing the desired degree of heat.

It should be noted that in both Figures 1 and 6 the heat producing unit is adjacent the blade. This arrangement will permit heating of the blade with a minimum of conduction and thereby prevent the loss of any appreciable amount of heat.

In Figures 7 to 12 inclusive I have shown my invention used with the ordinary straight razor. In this form, the handle or frame 19 is pivotally connected to the extension 20 of the blade 21 as at 22. As can be seen in Figure 11, the extension 20 is covered with a material which is non-conductive of heat.

The heel 24 of the blade, that is, that portion of the blade opposite the cutting edge, is provided with a longitudinal circular bore 25. A circular cartridge 26, having a plurality of orifices 27 and containing a chemical compound similar to that hereinbefore described, is adapted to be inserted within the bore 25. A closure cap 28 having a centrally located vent 29 closes the open end of the cartridge. Keys 30 are provided on the closure cap for fitting into grooves formed in the interior of the heel portion 24 for securely holding the cartridge in proper position within the bore 25.

A plurality of transverse apertures 31 are provided in the heel portion 24 which communicate with the orifices 27 in the cartridge 26 for enabling water to penetrate into the chemical substance.

A tube 32 having apertures 33 extends centrally through the cartridge and communicates with the vent 29 in the cap 28. It will be apparent that the tube 32, being surrounded by the chemical substance and in communication with the air, will enable any gases which are produced within the cartridge to escape therethrough into the atmosphere.

It is not believed necessary to go into detail regarding the operation of this form of my invention, as it functions in the same manner as those forms heretofore described in connection with Figures 1 to 6.

From the foregoing description, it will be appreciated that the chemical cartridges for generating heat can be easily and cheaply manufactured, and are highly efficient for maintaining the blade at the desired temperature throughout the process of shaving.

In lieu of employing a chemical compound for generating the desired heat, there are shown in Figures 13 to 17 two forms of electrical apparatus which may be used.

The blade supporting member 34 is provided with a shank 35 which is screw threaded into the end of the handle 1. The member 34 is recessed as at 36 and is provided with apertures 37 of non-heat-conductive material. An electrical resistance element 38 embedded in a suitable insulating material 39 is molded into the recess 36.

The necessary current is supplied to the resistance element by means of the lead lines 40 and 41. An insulator strip 45 is disposed between the leads 40 and 41 for reducing the hazard of short circuiting. The leads are provided with suitable insulation as shown at 42.

A plug 43 closing the end of the handle is drilled with a central bore 44 for allowing the leads to emerge from the handle. The two leads are housed within a single insulator 46 when they emerge from the handle. The end of the lead wires may be provided with a suitable electric connection (not shown), such as a floor plug, for supplying the current.

In Figure 14 it can be seen that a metallic plate 47 is molded into the upper portion of the blade supporting member 34. This plate will permit the heat from the resistance element to be conveyed to the blade, as will hereinafter become more apparent.

The plate is provided with a screw threaded extension 48 which is screwed into a fixed nut 49 of non-heat-conductive material which is carried by the keeper or guard 50. The keeper 50 is also provided with a pair of studs 51 which are used for the purpose well known and understood in the art. The keeper 50, as well as the support 34, is made of material which is non-conductive of heat for the same reasons as hereinbefore set forth.

In operation, the razor blade 17 is placed over the support and the keeper 50 is then screwed into place, the studs 15 extending through the apertures in the blade 17 and through the openings 37 in the supporting member 34. It can be seen that the razor is now ready for use. The lead wires are connected with a suitable source of electrical energy and the circuit is completed through the resistance. The heat created by the resistance is transmitted through the metal plate 47 to the blade 17. As clearly shown in Figure 15, the resistance element extends throughout the entire area of the blade supporting member. Obviously such a structure is most advantageous, as it will insure a thorough heating of the blade.

It will be readily apparent that, with the foregoing device, it is possible to maintain the blade 17 in a heated condition throughout the process of shaving.

In view of the fact that the resistance element is embedded within insulating material, and a metallic plate is molded thereover, it will be seen that there is no danger of water entering into and damaging any of the parts.

In Figure 16 I have shown the use of dry cells for generating the current. The dry cells 52 are housed within the handle 1. In this device, one of the leads, 41, is provided with a contact 53 which is in contact with a dry cell 52. The other lead, 40, is grounded to the handle 1 by means of a contact sleeve 54.

A switch generally designated 55 is of such construction that when it is turned to the "on" position it will contact the cell 52, thereby completing the circuit, through the cells, lead 41, resistance 38, lead 40 and casing 51.

In Figure 18 I have shown another form of my invention in which hot water is used for heating the blade. It is of course to be understood that I do not restrict myself to the use of hot water, as any suitable heating liquid or gas may be employed. The handle 56 is made of a material which is non-conductive of heat. Integrally formed with the handle 56 is a blade supporting portion 57 having a recessed area 58 and a pair of apertures 59. Molded into the open top portion of the member 57 is a metallic plate 60 which will serve as a conductor for transmitting heat to the blade 17. Suitably secured to the plate 60 at its midpoint is a screw threaded extension 61. The screw threaded extension 61 is adapted to be screwed into the fixed nut 62 anchored in the keeper 63. The keeper 63 is provided with the usual stud 64 and is made of the same material as the handle 56.

The handle 56 is provided with a channel 65 for the incoming hot water and a pair of channels 66 for the outgoing water. A T section 67 is fitted into the upper end of the channel 65 for directing the circulation of the hot water through the recessed area 58.

Positioned at the bottom of the channel 65 is a tube section 67 which is attached to a flexible tubing 68. The tubing 68 is adapted to be connected with a suitable source of water.

A screw threaded collar 69 is fitted onto the open end of the handle 56. A flexible sheathing 70 is fitted over the collar 69 and serves as a conduit for the water coming through channel 66.

In Figure 21 I have shown one form of device which may be used for supplying the water to the razor. There is shown a casing 71 having an extension 72 to which the flexible sheathing 70 is connected. A drain 73 is provided in the bottom of the casing for discharging the water.

Crimped as at 74 to the upper portion of the casing is a funnel like member 75 having a rubber gasket 76 positioned around its upper edge. A pipe section 77 integrally formed with the funnel is adapted to be secured to the flexible tubing 68.

The device shown in Figure 21 is adapted to be fitted onto the conventional hot water faucet. It is believed obvious that when the hot water is turned on it will flow through the funnel shaped section 75, through the pipe 77, into the flexible tubing 68, through the channel 65, out through the T section, and will be circulated through the area 58. The outgoing water will of course be directed through the channel 66 into the sheathing 70 and out through the drain 73 in the bottom of the casing 71.

It is of course to be understood that my invention is also applicable to razors which are made entirely of metal, the major difference being that in razors of this type the heat is so regulated as not to rise to a temperature at which the shaving process will be uncomfortable.

From the foregoing description it will be appreciated that I have devised a razor which is provided with means for keeping the blade in a heated condition for the duration of the shaving process. Moreover, due to the fact that all portions of the razor, with the exception of the blade, are made of materials which are non-conductive of heat, there can be no danger of injuring or burning the skin.

I may further add that the use of such a razor makes shaving more comfortable and easier, and saves frequent wetting, thereby increasing the durability of the blade.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a replaceable heating unit for generating heat while in position next to the blade of a razor, the elements comprising a hollow wafer, having vent holes in its walls adapted to permit ingress of water and egress of gases, walled tunnels joining the walls of the wafers and forming passageways through said wafer adapted to receive stud members of a keeper for a safety razor, said wafer adapted to contain a chemical, reactive with water for producing heat.

2. A replaceable heating unit for generating heat while in a safety razor comprising a substantially oblong hollow wafer, exhibiting in cross section a convex long wall adapted to fit against the inner curved surface of a safety razor blade, as said blade is held in place by a keeper, said wafer having vent holes in its walls adapted to permit ingress of water and egress of gases, said wafer having walled tunnels joining the walls of the wafers and forming passageways through said wafer adapted to receive stud members of a keeper for a safety razor, said wafer adapted to contain a chemical, reactive with water for producing heat.

FERNAN O. CONILL.